Patented Oct. 18, 1938

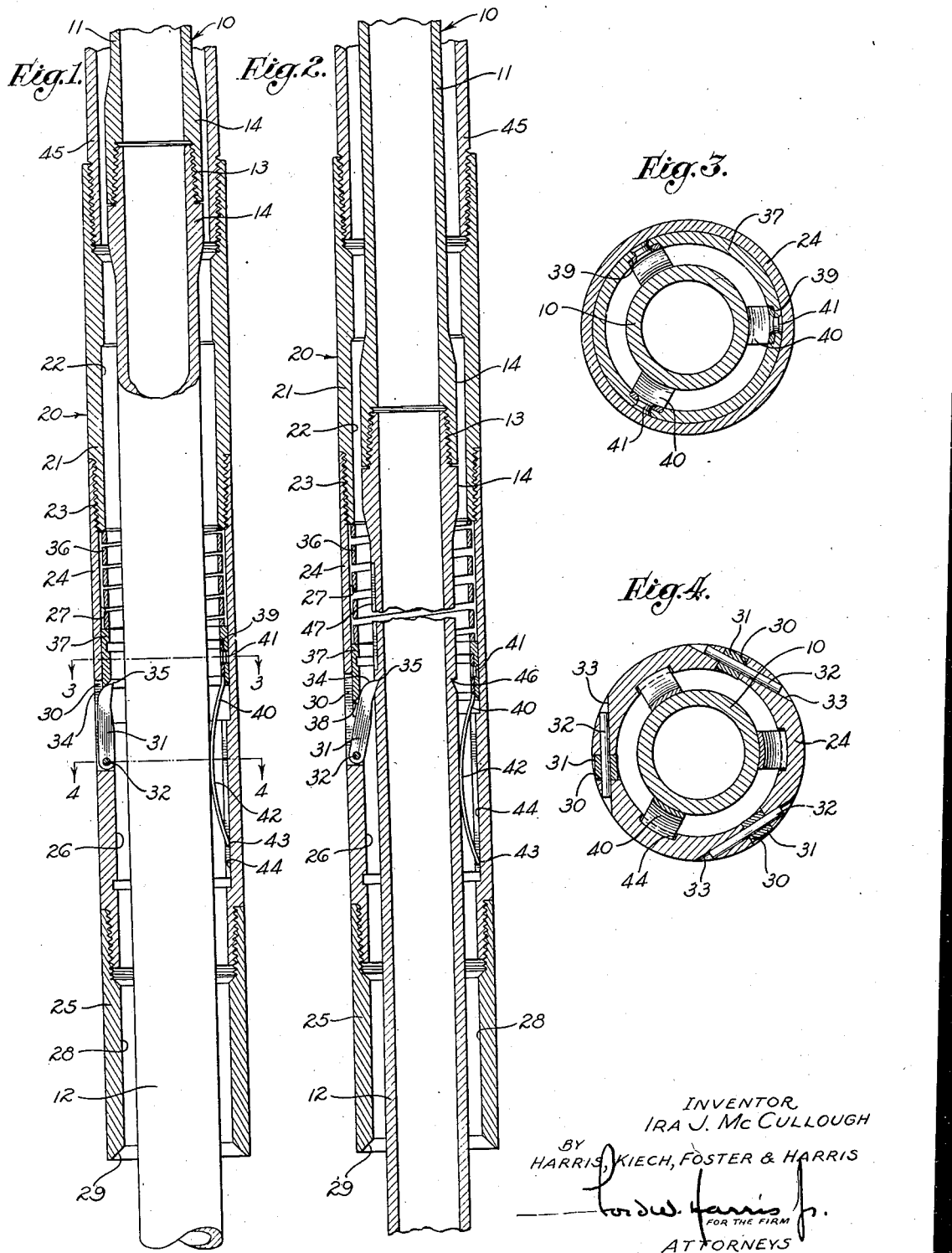

2,133,628

UNITED STATES PATENT OFFICE 2,133,628

WELL PIPE CUTTER

Ira J. McCullough, Los Angeles County, Calif.

Application March 29, 1938, Serial No. 198,679

15 Claims. (Cl. 164—0.6)

My invention relates to the art of cutting pipe, and more particularly relates to a method and apparatus for externally cutting pipe in a well.

The invention is of particular utility in the oil industry where drill pipe of relatively small external diameter is to be cut at great depths, and, accordingly, I shall describe it in connection with such use, although I do not wish to be limited thereby because, as will be apparent, my invention is susceptible of other uses.

In the oil industry, wells are ordinarily drilled by a rotary cutting bit secured to the lower end of a string of drill pipe which is rotated to perform the drilling operation. It frequently occurs that either the bit or the drill pipe may become jammed or stuck in the well during drilling and cannot be either rotated or removed from the well, in which case it is necessary to cut off and remove sections of the drill pipe until it has been recovered, as close to the bit as possible, and then fish out the stuck bit. Tools for this purpose are well known in the art, the commonest form being an overshot pipe cutter of the general design shown in the Reilly et al. Patent No. 1,625,391, issued April 19, 1927, in which a tubular body is equipped with inwardly pivoted cutter blades, the body being of sufficient internal diameter to pass over the drill pipe to be cut, being lowered into cutting position on a suitable string of wash pipe, and effecting the cutting operation by rotation thereof relative to the drill pipe, the cutter blades doing the actual cutting. In such prior art devices the cutter blades are fed to the work by a wedge ring which must be held against upward movement by spring arms engaging a collar on the drill pipe, so that the cutting must be done by contacting such a collar. If it is desired to cut the drill pipe at a level other than adjacent such a collar, or if drill pipe is used which either does not have collars or has no sharp shoulders which the spring arms of the prior art cutting devices can rigidly engage, the prior art pipe cutters cannot be employed satisfactorily. It is therefore a primary object of my invention to provide a pipe cutting device which may be employed to cut drill pipe in a well at any desired level. It is another object of my invention to provide a pipe cutting device capable of cutting drill pipe of any type, and particularly drill pipe which either has no sharp shoulders thereon or which is externally upset at the joints thereof.

Prior art cutting devices, as described above, also usually require a shear pin mechanism for holding the cutter blade feeding mechanism out of engagement with the cutter blades while they are being run into the well, with means for breaking the shear pin mechanism when the device has been lowered to cutting position. Such shear pin mechanisms have the common disadvantage that they may frequently be actuated before the tool is in cutting position by reason of intermittent upward movement of the tool during downward progress in the well, which permits the cutter blade actuating mechanism to move and hold the cutter blades in cutting position prematurely and before the tool has been completely lowered. Upon continued lowering of such prior art tools, the cutter blades may then be damaged by engaging shoulders or other obstructions on the drill pipe. Likewise, the shear pin releasing mechanism may be damaged by the repeated attempts of the operator, who may not know of the premature movement of the cutting blades to cutting position, to actuate this mechanism to move the blades to cutting position. Accordingly, it is a further object of my invention to provide a pipe cutting device which eliminates all such shear pin mechanisms to provide a simpler and more efficient and more positively operating tool than has heretofore been known.

Another object of my invention is to provide a pipe cutting device having novel means for preventing actuation of the cutter blade actuating mechanism thereof while the device is being lowered to pipe cutting position. To accomplish this I prefer to provide the cutter blade actuating mechanism with means for frictionally engaging the pipe as the device is being lowered to cutting position.

Still another object of the invention is to provide a method of positioning a pipe cutting device of the character described in cutting position in a well.

Other objects of the invention will be made evident from the following specification, which is for the purposes of illustration only, the claims, and the drawing in which:

Fig. 1 is a sectional elevational view of the invention with the parts in running-in position.

Fig. 2 is a sectional elevational view of the invention with the parts in cutting position.

Fig. 3 is a sectional view taken on the line 3—3 of Fig. 1.

Fig. 4 is a sectional view taken on the line 4—4 of Fig. 1.

Referring to the drawing, I show a drill pipe 10 comprised of a plurality of sections 11 and 12 threaded together as at 13, the end portions of each section being enlarged in manufacture to provide externally upset portions 14 to take the place of the separate collars usually used in the oil industry. The design of the drill pipe 10 is not a part of the present invention, but the present invention is particularly designed to operate on such type of drill pipe as will be pointed out hereinafter.

The invention comprises an overshot pipe cutting device 20 having an upper tubular member 21 having a bore 22, the upper tubular member being threaded at 23 to a central tubular member 24 which in turn has threaded to the lower end thereof a lower tubular member 25. The central tubular member 24 has a major bore 26 of substantially the same internal diameter as the bore 22, and has a minor bore 27 at the upper end thereof of greater internal diameter than the major bore. The lower tubular member 25 has a bore 28 of substantially the same internal diameter as the bore 22 and the major bore 26, and has its lower end bevelled at 29 to form a cutting edge for a purpose to be described hereinafter.

The central tubular member 24 is provided with a plurality of longitudinal slots 30, preferably three in number as shown in Fig. 4, in which are disposed cutter blades 31 pivoted on transverse pins 32 disposed in horizontal passages 33 drilled or otherwise formed in the central tubular member. The cutter blades 31 are loosely pivoted on the pins 32 so that they may rotate from retracted position, as shown in Fig. 1, to cutting position as shown in Fig. 2, or vice versa. The cutter blades 31 are provided at their upper ends with outer cam faces 34 and cutting points 35 at the upper ends thereof. Carried within the minor bore 27 of the central tubular member 24 is a flat faced compression spring 36 having its upper end engaging a shoulder formed by the lower end of the upper tubular member 21, and having its lower end engaging the upper end of a tubular feed collar 37 slidably disposed in the minor bore. The lower end of the tubular feed collar 37 is provided with an upwardly and inwardly bevelled face 38 adapted to engage the cam faces 34 of the cutter blades 31. The internal surface of the tubular feed collar 37 is provided with a plurality of vertical channels 39, preferably three in number as shown in Fig. 3, to receive the upper ends of vertical spring arms 40 which are rigidly secured to the tubular feed collar as by rivets 41. The spring arms 40 are formed of spring steel or other suitable material and are inwardly bowed as at 42 to engage the drill pipe 10 in frictional contact, the lower ends 43 thereof extending outwardly and into vertical recesses 44 formed in the central tubular member 24 so as to guide vertical movement of the feed collar 37 and prevent rotation thereof relative to the central tubular member. As shown in Fig. 4, it is preferable that the vertical recesses 44 be so disposed that the spring arms 40 are each opposite one of the cutter blades 31, although, of course, this is not a limitation on the invention, since the recesses may be otherwise disposed without departing from the spirit of the invention. It will also be noted that the internal diameters of the spring 36, the feed collar 37, the bore 22, the bore 28, and the major bore 26 are all substantially the same so as to provide a relatively smooth internal surface for the cutting device 20 so as to minimize the possibility of the cutting device catching while it is being run into the well.

In operation, when it is desired to cut a drill pipe in a well, such as the drill pipe 10, the cutting device 20 is secured to the lower end of a wash pipe 45, as by threading the upper tubular member 21 to the wash pipe, and the cutting device is then lowered into the well over the drill pipe. As the cutting device 20 is lowered into the well over the drill pipe, frictional engagement of the spring arms 40 with the drill pipe exerts an upward force on the feed collar 37 against the action of the compression spring 36, causing the feed collar to be retained in its uppermost position as shown in Fig. 1, in which the lower end thereof is sufficiently raised to permit the cutter blades 31 to pivot outwardly in the slots 30 to the position shown in Fig. 1. Thus, the cutter blades 31 may pivot outwardly to pass over any obstruction on the drill pipe, such as the externally upset portions 14 thereof, and since the spring arms 40 are formed of resilient material they also will readily pass over any obstructions formed on the drill pipe.

When the cutting device 20 has been lowered into the well to a desired point at which the drill pipe is to be cut, downward movement thereof is stopped. Upon cessation of the downward movement of the cutting device 20, the compression of the spring 36 overcomes the frictional engagement of the arms 40 with the drill pipe 10, and the spring causes the feed collar 37 to move downwardly, the bevelled face 38 thereof engaging the cam faces 34 of the cutter blades 31, to rotate the cutter blades inwardly about the pins 32 into engagement with the drill pipe, so that the cutting points 35 of the cutter blades are in the cutting position in which they engage the surface of the drill pipe. The cutting device 20 is then rotated by rotating the wash pipe 45 by suitable mechanism employed at the surface of the ground, and since the compression spring 36 exerts a considerable downward force on the feed collar 37, the feed collar holds the cutter blades 31 in tight cutting relation to the drill pipe 10, and rotation of the cutting device 20 causes the cutter blades to form a cut 46 on the drill pipe, as shown in Fig. 2. Since the compression spring 36 continues to exert a downward pressure on the feed collar 37, the cutter blades 31 continue to be fed into the drill pipe, and continued rotation of the cutting device will in time completely sever the drill pipe at the desired cut, following which the cutter blades will further rotate inwardly so as to receive the entire weight of the cut-off portion of the drill pipe, which may be then raised from the well by raising the cutting device and the wash string 45. Consequently, it is to be noted that it is unnecessary during the cutting operation to raise the wash string during the process thereof as is required in prior art devices, although this may be done if desired so as to hasten the cutting operation.

In the use of overshot pipe cutting devices in the oil industry, it is usual to reciprocate the cutting device several times after it has been lowered to approximately cutting position so as to insure that the wash pipe carrying the cutting device is freely movable in the well and is not jammed or otherwise held against rotation, and this method of operation is also desirable with my invention. Thus, it may be preferable, after the cutting device 20 has been lowered to approximately cutting position in the well, to move it up and down several times in the well to insure that the wash string 45 is free to move relative to the drill pipe 10. Since the cutting blades 31 are rotated inwardly into cutting position as soon as downward movement of the cutting device 20 in the well is stopped, it will be obvious that upward movement of the cutting device prior to rotation will cause the cutter blades to dig into the drill pipe to form scores as shown at 47. The depth of the scores 47 will vary, of course, with the number of times which the cutting device 20 is raised and lowered relative to the drill pipe 10, but in any event will be of sufficient depth that if the cutter blades 31 are allowed to remain in the scores when rotation of the cutting device relative to the drill pipe is commenced, the cutter blades will be required to make a deep initial cut in the drill pipe in order to move out of the scores 47, which has a tendency to break or damage the cutting points 35 of the cutter blades, which is extremely undesirable. This danger may be obviated by always moving the cutting device 20 downwardly relative to the drill pipe 10 a distance at least slightly greater than any previous downward movement thereof just prior to commencement of rotation of the cutting device relative to the drill pipe so as to insure that the cutter blades 31 have moved entirely out of the scores 47 so that the cutting points 35 thereof rest in cutting engagement with the smooth surface of the drill pipe. The cutting operation may then be performed without danger of breaking or damaging the cutting points 35 of the cutter blades 31. This method of operation, although not essential in some cases, is recommended for the average cutting operation.

It will thus be noted that my invention may be used to cut drill pipe at any desired point throughout the length thereof, which is a material advantage over prior art devices such as shown in the Reilly et al. Patent No. 1,625,691, with which cutting may only be accomplished at a particular point on the drill pipe relative to one of the collars connecting the sections thereof. Furthermore, as pointed out hereinabove, no shear pin is required to be broken prior to the cutting operation of my device, which is a further material advantage. Furthermore, it will be apparent that my device is readily capable of operation to cut drill pipe of the externally upset type shown in the drawing herein, whereas prior art devices of the type shown in the Reilly et al. patent are incapable of satisfactory operation on such drill pipe by reason of the fact that the externally upset portions thereof provide no means for preventing upward movement of the feed rings thereof relative to the drill pipe.

Although I have described my invention and the operation thereof in simple and practical form, it will be understood that certain parts thereof may be substituted by other parts without departing from the spirit of my invention, and accordingly I do not wish to be limited to the specific details thereof shown and described, but intend to be afforded the full scope of protection of the following claims.

I claim as my invention:

1. In a device of the character described adapted to cut a pipe, the combination of: a body member; a cutter blade pivoted to said body member and movable from retracted position to cutting position; cutter blade actuating mechanism including a yieldable element for moving said cutter blade from retracted to cutting position; and means substantially immovably connected to said cutter blade actuating mechanism for frictionally engaging said pipe while said body member is being moved relative to the pipe in one direction so as to oppose the action of said yieldable element and prevent said cutter blade actuating mechanism from moving said cutter blade from retracted to cutting position.

2. In a device of the character described adapted to cut a pipe, the combination of: a body member; a cutter blade pivoted to said body member and movable from retracted position to cutting position; cutter blade actuating mechanism including an axially compressible spring for moving said cutter blade from retracted to cutting position; and a spring arm connected to said cutter blade actuating mechanism for frictionally engaging said pipe while said body member is being moved relative to the pipe in one direction so as to compress said spring and prevent said cutter blade actuating mechanism from moving said cutter blade from retracted to cutting position.

3. In a device of the character described adapted to cut a pipe, the combination of: a body member; a cutter blade pivoted to said body member and movable from retracted position to cutting position; cutter blade actuating mechanism for resiliently moving said cutter blade from retracted to cutting position, including spring means; and means substantially immovably connected to said cutter blade actuating mechanism for frictionally engaging said pipe while said body member is being moved relative to the pipe in one direction so as to prevent said cutter blade actuating mechanism from moving said cutter blade from retracted to cutting position.

4. In a device of the character described adapted to cut a pipe, the combination of: a tubular body member adapted to fit over the pipe to be cut; a cutter blade pivoted to said body member and movable from retracted position to cutting position; cutter blade actuating mechanism including a compressible helical spring for moving said cutter blade from retracted to cutting position; and means susbtantially immovably connected to said cutter blade actuating mechanism for frictionally engaging said pipe while said body member is being moved relative to the pipe in one direction so as to compress said helical spring and prevent said cutter blade actuating mechanism from moving said cutter blade from retracted to cutting position.

5. In a device of the character described adapted to cut a pipe, the combination of: a body member; a cutter blade pivoted to said body member and movable from retracted position to cutting position; cutter blade actuating mechanism for moving said cutter blade from retracted to cutting position; means connected to said cutter blade actuating mechanism for frictionally engaging said pipe while said body member is being moved relative to the pipe in one direction so as to prevent said cutter blade actuating mechanism from moving said cutter blade from retracted to cutting position; and means for preventing relative rotation between said cutter blade actuating mechanism and said body member.

6. In a device of the character described adapted to cut a pipe, the combination of: a tubular body member adapted to fit over the pipe to be cut; a cutter blade pivoted to said body member and movable from retracted position to cutting position; cutter blade actuating mechanism for resiliently moving said cutter blade from retracted to cutting position, including spring means; a spring arm connected to said cutter blade actuating mechanism for frictionally engaging said pipe while said body member is being moved relative to the pipe in one direction so as to prevent said cutter blade actuating mechanism from moving said cutter blade from retracted to cutting position; and means for preventing relative rotation between said cutter blade actuating mechanism and said body member.

7. In a device of the character described adapted to cut a pipe, the combination of: a body member; a cutter blade pivoted to said body member; a cutter blade actuating member longitudinally movable relative to said body member for moving said cutter blade from retracted to cutting position; actuating means including a spring device for longitudinally moving said cutter blade actuating member relative to said body member so as to move said cutter blade from retracted to cutting position; and means substantially immovably connected to said cutter blade actuating member for frictionally engaging said pipe while said body member is being moved relative to the pipe in one direction so as to compress said spring device and prevent said actuating means from moving said cutter blade actuating member while said body member is being moved in said direction.

8. In a device of the character described adapted to cut a pipe, the combination of: a tubular body member adapted to fit over the pipe to be cut; a cutter blade pivoted to said body member; a feed member movable relative to said body member for moving said cutter blade from retracted position to cutting position; a compresion spring engaging said feed member and adapted to resiliently urge said feed member downwardly into engagement with said cutter blade so as to move said blade from retracted position to cutting position in engagement with said pipe; and means substantially immovably secured to said feed member for preventing said feed member from moving said cutter blade from retracted to cutting position while said tubular body member is being lowered over said pipe, said compression spring moving said feed member to move said cutter blade from retracted to cutting position when downward movement of said tubular member is stopped.

9. In a device of the character described adapted to cut a pipe, the combination of: a tubular body member; an upwardly directed cutter blade pivoted at its lower end to said body member and having a cam face; a tubular feed ring slidable in said body member and adapted to engage said cam face to rotate said cutter blade inwardly into cutting engagement with said pipe; a compression spring engaging said feed ring for moving it to rotate said cutter blade; and a spring arm connected to said feed ring and adapted to frictionally engage the pipe while said body member is being lowered relative to said pipe to counteract the action of said spring and prevent said feed ring from rotating said cutter blade into cutting position.

10. In a device of the character described adapted to cut a pipe, the combination of: a first member; a cutter blade pivoted to said first member and having a cam face formed thereon; a second member disposed with relation to said first member for movement relative thereto, said second member having a cam engaging face formed thereon for engaging said cam face to rotate said cutter blade from retracted to cutting position; actuating means for causing relative movement between said members so as to rotate said cutter blade to cutting position; and means substantially immovably connected to one of said members for frictionally engaging said pipe while said device is being moved relative to said pipe in one direction to prevent operation of said actuating means.

11. In a device of the character described adapted to cut a pipe in a well, the combination of: a body member; a cutter blade carried by said body member and movable from a retracted position to a cutting position in engagement with a pipe to be cut; means for actuating said cutter blade to move the same from retracted to cutting position; means other than gravity constantly tending to exert pressure upon said cutter blade actuating means; means for lowering said body member relative to said pipe; and means operatively associated with said cutter actuating means arranged and constructed so that it restrains said pressure means from moving said cutter blade to cutting position while said body member is being lowered, but automatically permits such movement upon cessation of said lowering.

12. A device of the character described in claim 11, in which the pressure means for actuating the cutter blade from retracted to cutting position includes an axially compressible spring normally under sufficient compressive stress to operate said actuating mechanism to move said cutter blade into cutting position.

13. In a device of the character described adapted to cut a pipe in a well, the combination of: a body member; a cutter blade pivoted at one end to said body member and movable between a retracted position and an extended position, said cutter blade when in said extended position having its free end disposed towards the longitudinal axis of the well and in alignment with the pipe therein; means for lowering said body member into the well; cutter blade actuating mechanism including a member holding said cutter blade in said extended position and mechanical means constantly tending to exert downward pressure upon said holding member during downward movement of said body member in the well and before the body member reaches the upper end of the pipe therein; and restraining means for controlling said cutter blade actuating mechanism constructed to engage said pipe during said downward movement so as to release the pressure of said holding member on said cutter blade prior to the engagement of the cutter blade with said pipe.

14. A device of the character described in claim 13, in which the restraining means, upon cessation of downward movement of the body member relative to the pipe, automatically permits the cutter blade actuating mechanism to move said cutter blade into pressure-engagement with the pipe.

15. A device of the character described in claim 13 in which the means for normally exerting downward pressure on the holding member includes an axially compressible spring, and in which the restraining means includes means for moving said holding member upwardly against the action of said spring.

IRA J. McCULLOUGH.